US012266195B2

(12) United States Patent
Saha

(10) Patent No.: US 12,266,195 B2
(45) Date of Patent: Apr. 1, 2025

(54) VEHICULAR DRIVER MONITORING SYSTEM WITH ALERT TO OTHER VEHICLES

(71) Applicant: Magna Electronics Inc., Auburn Hills, MI (US)

(72) Inventor: Sudeshna Saha, Novi, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 101 days.

(21) Appl. No.: 18/314,202

(22) Filed: May 9, 2023

(65) Prior Publication Data

US 2023/0368548 A1 Nov. 16, 2023

Related U.S. Application Data

(60) Provisional application No. 63/364,421, filed on May 10, 2022.

(51) Int. Cl.
| | | |
|---|---|---|
| B60Q 1/54 | (2006.01) | |
| B60Q 1/50 | (2006.01) | |
| B60Q 9/00 | (2006.01) | |
| B60R 1/04 | (2006.01) | |
| B60R 1/12 | (2006.01) | |
| G06V 20/59 | (2022.01) | |
| H04N 7/18 | (2006.01) | |
| H04N 23/54 | (2023.01) | |

(52) U.S. Cl.
CPC ........... *G06V 20/597* (2022.01); *B60Q 1/544* (2022.05); *B60Q 9/008* (2013.01); *B60R 1/04* (2013.01); *B60R 1/12* (2013.01); *H04N 7/183* (2013.01); *H04N 23/54* (2023.01); *B60R 2001/1253* (2013.01)

(58) Field of Classification Search
None
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |
| 6,690,268 B2 | 2/2004 | Schofield et al. |
| 6,693,517 B2 | 2/2004 | McCarthy et al. |
| 7,580,795 B2 | 8/2009 | McCarthy et al. |
| 7,914,187 B2 | 3/2011 | Higgins-Luthman et al. |
| 9,405,120 B2 | 8/2016 | Graf et al. |
| 9,555,736 B2 | 1/2017 | Solar et al. |
| 10,017,114 B2 | 7/2018 | Bongwald |

(Continued)

*Primary Examiner* — Jefferey F Harold
*Assistant Examiner* — Charles N Hicks
(74) *Attorney, Agent, or Firm* — HONIGMAN LLP

(57) ABSTRACT

A vehicular driver monitoring system includes a camera disposed at an interior cabin of a vehicle. Electronic circuitry of an ECU includes an image processor for processing image data captured by the camera. The camera views at least a head region of a driver of the vehicle and is operable to capture image data. Based on processing at the ECU of the captured image data, the vehicular driver monitoring system determines an attentiveness level of the driver. Responsive to determination that the attentiveness level of the driver is below a threshold level of attentiveness, the vehicular driver monitoring system alerts a person exterior the vehicle of the determined inattentive driver.

25 Claims, 2 Drawing Sheets

(56) References Cited

U.S. PATENT DOCUMENTS

| | | |
|---|---|---|
| 10,065,574 B2 | 9/2018 | Tiryaki |
| 10,819,943 B2 | 10/2020 | Van Dan Elzen |
| 10,958,830 B2 | 3/2021 | Koravadi |
| 11,639,134 B1 | 5/2023 | Huizen et al. |
| 11,780,372 B2 | 10/2023 | Sobecki et al. |
| 11,827,153 B2 | 11/2023 | Miller et al. |
| 2009/0066065 A1* | 3/2009 | Breed .............. G01S 17/88 340/573.1 |
| 2012/0062743 A1 | 3/2012 | Lynam et al. |
| 2012/0218412 A1 | 8/2012 | Dellantoni et al. |
| 2013/0222592 A1 | 8/2013 | Gieseke |
| 2014/0218529 A1 | 8/2014 | Mahmoud et al. |
| 2014/0285666 A1 | 9/2014 | O'Connell et al. |
| 2014/0336876 A1 | 11/2014 | Gieseke et al. |
| 2014/0375476 A1 | 12/2014 | Johnson et al. |
| 2015/0009010 A1 | 1/2015 | Biemer |
| 2015/0015710 A1 | 1/2015 | Tiryaki |
| 2015/0022664 A1 | 1/2015 | Pflug et al. |
| 2015/0092042 A1 | 4/2015 | Fursich |
| 2015/0124096 A1 | 5/2015 | Koravadi |
| 2015/0158499 A1 | 6/2015 | Koravadi |
| 2015/0232030 A1 | 8/2015 | Bongwald |
| 2015/0251599 A1 | 9/2015 | Koravadi |
| 2015/0294169 A1 | 10/2015 | Zhou et al. |
| 2015/0296135 A1 | 10/2015 | Wacquant et al. |
| 2015/0352953 A1 | 12/2015 | Koravadi |
| 2016/0036917 A1 | 2/2016 | Koravadi et al. |
| 2016/0137126 A1 | 5/2016 | Fursich et al. |
| 2016/0209647 A1 | 7/2016 | Fursich |
| 2016/0210853 A1 | 7/2016 | Koravadi |
| 2017/0217367 A1 | 8/2017 | Pflug et al. |
| 2017/0274906 A1 | 9/2017 | Hassan et al. |
| 2018/0134217 A1 | 5/2018 | Peterson et al. |
| 2018/0222414 A1 | 8/2018 | Ihlenburg et al. |
| 2018/0229725 A1* | 8/2018 | Akama .............. G06V 20/584 |
| 2018/0231976 A1 | 8/2018 | Singh |
| 2020/0143560 A1 | 5/2020 | Lu et al. |
| 2020/0202151 A1 | 6/2020 | Wacquant |
| 2020/0320320 A1 | 10/2020 | Lynam |
| 2021/0155167 A1 | 5/2021 | Lynam et al. |
| 2021/0162926 A1 | 6/2021 | Lu |
| 2021/0245662 A1 | 8/2021 | Blank et al. |
| 2021/0291739 A1 | 9/2021 | Kasarla et al. |
| 2021/0323473 A1 | 10/2021 | Peterson et al. |
| 2022/0111857 A1 | 4/2022 | Kulkarni |
| 2022/0242438 A1 | 8/2022 | Sobecki et al. |
| 2022/0254132 A1 | 8/2022 | Rother |
| 2022/0377219 A1 | 11/2022 | Conger et al. |
| 2024/0064274 A1 | 2/2024 | Blank et al. |

* cited by examiner

VEHICULAR DRIVER MONITORING SYSTEM WITH ALERT TO OTHER VEHICLES

CROSS REFERENCE TO RELATED APPLICATION

The present application claims the filing benefits of U.S. provisional application Ser. No. 63/364,421, filed May 10, 2022, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A driver monitoring system utilizes one or more cameras to capture image data representative of images interior of the vehicle. The camera may view at least a head region of a driver sitting in a driver seat of the vehicle. A control or electronic control unit (ECU) includes electronic circuitry, such as an image processor, and associated software to process image data captured by the camera. The control, responsive to processing of image data captured by the camera, determines a drowsiness or attentiveness level of the driver. Responsive to the drowsiness level of the driver being above a threshold level (or the attentiveness level of the driver being below a threshold level of attentiveness), the system communicates a signal exterior of the vehicle, such as to another vehicle in an environment surrounding the equipped vehicle. The signal is representative of the drowsiness level of the driver being above the threshold level (or the attentiveness level of the driver being below the threshold level of attentiveness).

For example, the attentiveness level of the driver may be determined to be below the threshold level when the driver has been alerted to their inattentive behavior a threshold number of times or for a threshold period of time. The threshold level of attentiveness may also be satisfied when the driver exhibits behavior that is characterized as drowsiness or inattentiveness elevated above a threshold level.

The driver monitoring system may communicate the signal by illuminating an exterior light of the vehicle, such as a brake light or taillight, a turn indicator, or a center high mounted stop light (CHMSL) of the vehicle. Optionally, the signal may comprise a wireless communication to the other vehicle indicative of the equipped vehicle driver's drowsiness.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system and/or driver monitoring system operates to capture images exterior and/or interior of the vehicle and may process the captured image data to monitor occupants of the vehicle and/or display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data.

Figure 1:
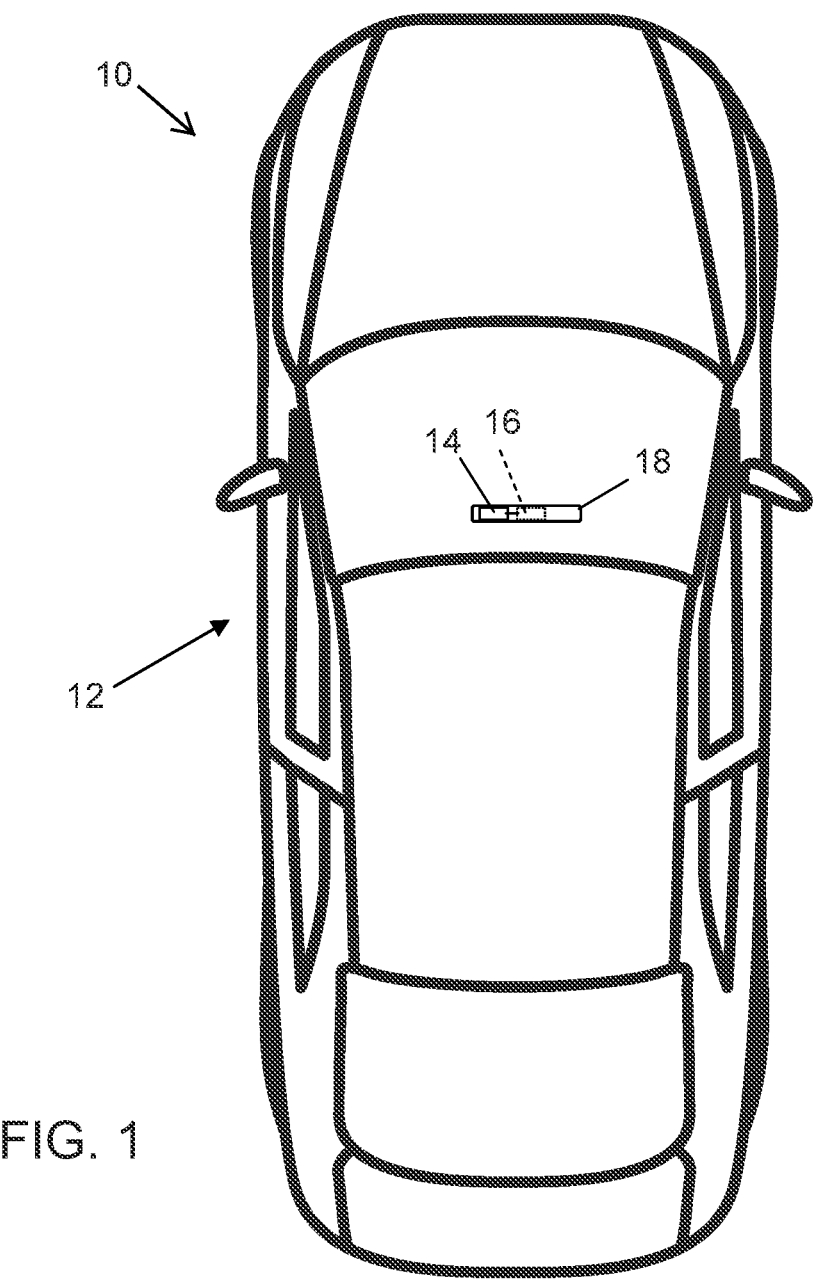
FIG. 1 is a plan view of a vehicle with a driver monitoring system.

Referring now to the drawings and the illustrative embodiments depicted therein, a vehicle 10 includes a driver monitoring system 12 that includes at least one interior viewing imaging sensor or camera 14, with the camera having a lens for focusing images at or onto an imaging array or imaging plane or imager of the camera (FIG. 1). The system 12 includes a control or electronic control unit (ECU) 16 that comprises electronic circuitry and associated software, with the electronic circuitry including a data processor or image processor that is operable to process image data captured by the camera or cameras (and may process image data captured by other cameras at the vehicle, such as exterior viewing cameras disposed at locations so as to have respective fields of view exterior of the vehicle) and/or may provide an output to a display device for displaying video images for viewing by the driver of the vehicle. Although shown in the illustrated embodiment as disposed at an interior rearview mirror assembly 18 of the vehicle 10, the driver monitoring camera 14 and ECU 16 may be disposed at any suitable position within the vehicle, such as at a dashboard or gauge cluster or windshield mounted electronics module or the like. The data transfer or signal communication from the camera to the ECU may comprise any suitable data or communication link, such as a vehicle network bus or the like of the equipped vehicle.

As discussed below, the driver monitoring system operates to determine a drowsiness or attentiveness level of the driver of the vehicle. Responsive to a determination that the driver is drowsy or inattentive, the system may display an alert or communicate a signal (such as an audio, haptic, or visual signal) to the driver indicative of the driver's drowsiness or inattentiveness. If the system determines that the driver is above a threshold level of drowsy (or that an attentiveness level of the driver is below a threshold level of attentiveness), the system communicates a driver drowsy signal or an inattentive driver signal (such as an audio or visual signal or a wireless communication) exterior the vehicle indicative of the driver's continued or elevated level of drowsiness or inattentiveness or non-responsiveness to the driver alerts provided by the system to the driver (e.g., so that another vehicle or pedestrian in the environment surrounding the equipped vehicle may perceive the driver drowsy signal or inattentive driver signal and be made aware of the driver's drowsiness and/or inattentiveness).

The driver monitoring system includes a driver monitoring camera 14 that captures image data representative of the driver's head. The camera 14 may be disposed at a dashboard or instrument panel of the vehicle 10 and has the principal axis of its field of view directed toward the face of the driver. Optionally, the driver monitoring camera 14 may be disposed at any suitable position at the interior portion of the vehicle 12 and viewing the head region of the driver, such as at an interior rearview mirror assembly 18 (such as disposed behind and viewing through the mirror reflective element of the interior rearview mirror assembly). That is, the driver monitoring camera 14 may be accommodated within the mirror head of the interior rearview mirror assembly 18 and disposed behind the mirror reflective element of the mirror assembly so that, with mounting structure of the mirror assembly attached at the interior portion of the vehicle cabin (e.g., an in-cabin side of the vehicle windshield), the camera views through the mirror reflective element (such as through a transflective mirror reflector of the mirror reflective element) to view at least the driver head region of the vehicle cabin. The driver monitoring camera 14 and system 12 may utilize any suitable driver monitoring camera and system to determine the drowsiness or attentiveness level of the driver of the vehicle.

The driver monitoring system captures image data representative of the head region of the driver of the vehicle and processes the captured image data to determine the attentiveness or drowsiness level of the driver. For example, the system may determine a gaze direction or principal axis of the line of sight for the driver and determine whether the driver is looking at the road (and optionally where the driver is looking at the road or exterior the vehicle) or whether the driver is looking elsewhere (such as looking interior the vehicle at an infotainment display or looking at a rearview mirror or looking at a mobile device like a cellphone). Optionally, the system may receive and process other sensor data indicative of the driver's attentiveness, such as from capacitive touch sensors at the steering wheel indicating a driver's hand positions at the steering wheel, or the system may receive signals from one or more other systems of the vehicle, such as a volume level inside the vehicle from the infotainment system or an indication that the driver is receiving navigation directions from a navigation system of the vehicle. Optionally, the system may determine behaviors of the driver (such as based on the determined gaze direction and/or hand positions of the driver within the cabin of the vehicle) and determine or characterize the determined behaviors as attentive or inattentive or drowsy behaviors. Based on the determined characterization of the behavior, the system determines whether the driver is attentive or inattentive or drowsy. The driver monitoring system may process the image data, sensor data, and/or received signals to determine the attentiveness or drowsiness level of the driver, such as to adjust a level of autonomous or semiautonomous control of the vehicle. For example, the system may utilize characteristics of the systems described in U.S. Publication No. US-2018-0231976, which is hereby incorporated herein by reference in its entirety.

Further, the driver monitoring system, when the attentiveness or drowsiness level of the driver is determined to satisfy a threshold (i.e., the driver is considered inattentive or drowsy), transmits a signal or alert to the driver indicating that the driver is inattentive or drowsy. For example, the system may provide haptic alerts (such as vibrations at the steering wheel or driver's seat) or visual alerts (such as a message at the gauge cluster or heads up display (HUD)) or audio alerts (such as an audible tone or message) to attempt to raise the driver's awareness or encourage the driver to take a break during a long journey.

Although the driver monitoring system may communicate multiple or continuous alerts to the driver regarding their drowsiness or inattentiveness, the driver may nevertheless ignore or fail to notice the alerts and continue to drive the vehicle and/or perform inattentive behavior. This continued behavior may be dangerous to the driver and occupants of the equipped vehicle and to other vehicles and pedestrians surrounding the vehicle.

In other words, driver drowsiness is a concern since it has been reported that about 22 percent of road crashes occur at high speeds and it may become mandatory for all vehicles to be equipped with driver drowsiness and attention warning (DDAW) systems in certain jurisdictions. Current DDAW systems only warn the driver to pay attention, but a driver at high speed is also at risk to other nearby vehicles. That is, a vehicle is never driven in isolation and severely drowsy drivers are not only a hazard for themselves but also for nearby vehicles and pedestrians.

The driver monitoring system recognizes or determines that the driver has reached or exceeded a threshold level of drowsiness or inattentiveness or non-responsiveness to alerts and communicates a signal to alert other vehicles and/or pedestrians of the driver's drowsy or inattentive state. For example, the system may determine that the driver is drowsy or inattentive and then determine that the driver has received a threshold number of drowsiness alerts or that the driver has been drowsy for a threshold period of time, and then communicate the signal. The signal may comprise an audio signal (such as a tone or actuation of the vehicle horn), a visual signal (such as illuminating an exterior light of the vehicle or activating the hazard lights of the vehicle or providing a displayed message on a display or reconfigurable display that is viewable by drivers of other vehicles), or a wireless communication communicated to another vehicle or to a user device remote from the equipped vehicle.

The driver monitoring system may refrain from communicating a signal exterior the vehicle until the driver is determined to be above a threshold level of drowsy (i.e., the driver is considered inattentive or drowsy) so that the driver may have the opportunity to correct their behavior. That is, in a normal event, the DDAW system is used to issue an alert/warning to the driver in the case of inattentiveness/drowsiness after which the driver then pauses for a break or disables the warning. In the event the driver does not take the subsequent action, it may be a potential hazard situation where the driver is continuing to drive despite being drowsy/impaired for a long time. In such situations, pedestrians and other vehicles, such as vehicles coming from behind, need to be extra cautious around the equipped vehicle. The warning of the signal will allow the incoming vehicles to apply caution and prevent a potentially hazardous situation. Since the escalation will only occur after the driver has been warned, the driver will have ample time to mitigate the situation giving the driver enough control as well.

The drowsiness threshold may be satisfied in any suitable manner. For example, the system may determine that the driver is exhibiting behaviors indicative of an elevated drowsiness or inattentiveness such that the driver's drowsiness itself is above the threshold level of drowsy. That is, the system may determine that the driver is performing behaviors that are characterized as being above the threshold level of drowsy or below the threshold level of attentiveness. Such behaviors may include averting gaze from the road for a threshold period of time, frequent dropping of the head or blinking as if falling asleep, or the vehicle drifting into an adjacent lane without correction from the driver. Thus, the system may not communicate the signal exterior the vehicle until the behavior of the driver includes certain actions/inactions or categories of actions/inactions.

Optionally, the system may determine that the drowsiness threshold has been satisfied when the driver has been determined drowsy for a threshold period of time. For example, a threshold period of time may have passed since an initial alert has been communicated to the driver and the driver has not corrected or improved their behavior to indicate that they are not drowsy or inattentive. Similarly, the threshold may be satisfied when a threshold number of alerts have been communicated to the driver or when an alert has been displayed to the driver for a threshold period of time and the driver has failed to provide a response to the alert (such as via user input prompted by a message at a display of the vehicle). The threshold number of alerts or threshold period of time may be adjusted based on a determined level of drowsiness of the driver. Thus, the driver may be afforded an opportunity to correct their behavior or respond to the one or more alerts before the signal is communicated exterior the vehicle.

That is, with vehicles equipped with a DDAW system, if the driver does not turn off driver drowsiness warning or driver drowsiness warning pops up several times in a row for a prolonged time (for example, five minutes or longer), then the warning signal will be communicated to warn other vehicles and/or pedestrians of the impaired degraded state of the driver. In other words, if the DDAW system warns for a long period without correction from the driver, the driver is determined to be severely drowsy to not be able to handle the warnings initially. In such cases of severe drowsiness, there is a signal to notify surrounding vehicles and/or pedestrians of the driver condition, allowing them to drive with extra caution.

When the threshold is satisfied, the system communicates the signal exterior the vehicle and the signal may comprise any suitable external communication. For example, the system may illuminate an external lighting module of the vehicle. The light may be a dedicated drowsiness indicator light that is only operable to communicate the signal indicative of the driver's elevated drowsiness level or the system may utilize an existing light of the vehicle. For example, the system may illuminate the taillight or brake light of the vehicle, one or more turn indicators of the vehicle, hazard lights of the vehicle, or a center high mounted stop light (CHMSL) of the vehicle. When communicating the signal using an existing light, the system may illuminate the light in a unique configuration. For example, the system may illuminate the light in a different color, blinking pattern, or symbol than the light's primary use.

That is, the continuous driver drowsy signal may be integrated within the exterior lights of the vehicle to notify rear vehicles of a driver in incapacitated/drowsy state for a prolonged period despite an active warning to the driver. The system may use separately installed lamps and/or use existing rear lamps (e.g., turn indicators or brake lights) to notify other vehicles of the driver being in a continuous drowsy state. In other words, the system may include additional exterior lights or use existing exterior lights such as taillights or parking lights in a different configuration (flashes per second or different illumination) to communicate the driver drowsy signal. In addition, a symbol or display or icon may be placed at the vehicle rear windshield which illuminates and flashes when the signal is active. The lamps are controlled by a signal which is derived from maturation of the DDAW signal.

Optionally, the signal may include a wireless communication, such as to other vehicles in the vicinity of the equipped vehicle, user devices (e.g., mobile phones) in the vicinity of the equipped vehicle, and/or a remote server in wireless communication with the equipped vehicle. For example, the system may wirelessly communicate with another vehicle following the equipped vehicle indicating the drowsiness level of the driver of the equipped vehicle so that the driver of the other vehicle may be made aware of the potentially hazardous driving condition and react accordingly.

Similarly, the system may wirelessly communicate the signal to a remote server. For example, the remote server may enable navigation services for vehicles and the signal may allow the navigation service to alert other drivers on the road as to the presence of the equipped vehicle having a drowsy or inattentive driver. Optionally, the remote server may alert emergency personnel (e.g., police or other road safety personnel) as to the presence of the drowsy or inattentive driver so that necessary precautionary measures may be taken to prevent accidents and further dangerous driving behaviors. Thus, the signal may be communicated from the equipped vehicle to other vehicles surrounding the equipped vehicle so that the other drivers may react accordingly (e.g., drive more cautiously or honk their horn to alert the driver).

Figure 2:
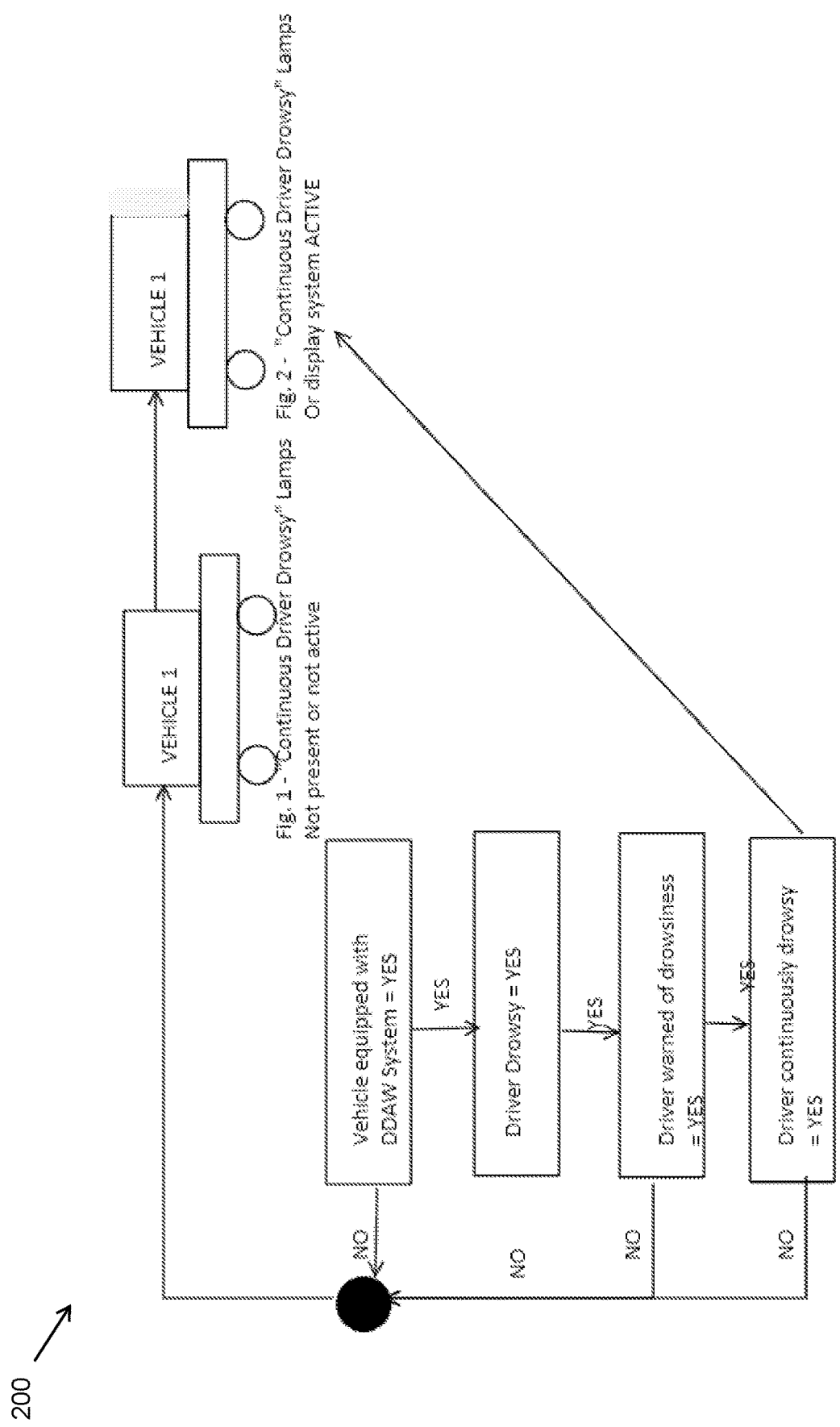
FIG. 2 is a flow diagram showing operation of the driver monitoring system in determining whether to communicate a signal indicative of the driver's continued drowsiness state to another vehicle in the environment surrounding the equipped vehicle.

FIG. 2 depicts a flow diagram 200 of the driver monitoring system in determining to communicate the signal indicative of the driver's continued drowsiness state. In a default or non-drowsy state, the continuous driver drowsy lamps or indicators are in an inactive state and the indicators remain inactive until the driver is determined to be continuously drowsy (for at least a threshold period of time). The system determines whether the driver is drowsy and, when the driver is determined to be drowsy, the system warns the driver. After the driver is warned, the system determines if the driver is continuously drowsy and, if the driver is determined to be continuously drowsy, the indicators are activated.

Thus, the driver monitoring system provides a warning or signal to other vehicles and/or pedestrians of an elevated or continuous drowsiness or inattentive state of the driver of the equipped vehicle.

Currently, there is no notification for nearby, including rearward or following vehicles, of the impaired or drowsy condition of the driver. That is, there is no system to notify nearby vehicles, including vehicles approaching from the rear at higher speeds, to the possibly impaired situation of the driver putting them under a risk of driving close to the vehicle with an impaired/drowsy driver. The exterior/rear display of the driver impaired state will be an improvement on the existing DMS in that the notification will extend beyond the particular drowsy driver. The solution may be achieved in two parts: software and a display unit. The software determines whether the display system should be illuminated or not. The display system may illuminate as per the design intent. The system may create a software signal in the vehicle bus (CAN, etc.) which is assigned a value of ACTIVE/INACTIVE based on how long the Drowsiness Signal or Driver Impairment Signal has been ACTIVE. The system may use this software signal to control the Continuous Driver Drowsy display system.

Notifying rear or surrounding vehicles will allow them to drive with caution around the vehicle. Optionally, in some situations, the nearby vehicles can also communicate to the driver (e.g., via honking of a horn or the like). Potential accidents in both situations (i.e., for the driver of the equipped vehicle and the driver of the other vehicle) can be avoided. The system eliminates or reduces potential crashes and accidents, especially on highways, freeways, and the like where driver drowsiness and high speed are common events most often occurring together.

Thus, if the system determines that the driver is above a threshold level of drowsiness or inattentiveness, the system communicates a continuous driver inattentive signal (such as an audio or visual signal or a wireless communication) exterior the vehicle (e.g., to another vehicle or pedestrian in the environment surrounding the equipped vehicle) indicative of the driver's continued or elevated level of drowsiness or inattentiveness or non-responsiveness to the driver. The system may communicate the signal indicative of the driver's continued drowsiness state directly to another vehicle in the environment surrounding the equipped vehicle (such as via wireless communication). Optionally, the driver monitoring system may communicate the signal by illuminating an exterior light of the vehicle, such as a brake light or taillight, a turn indicator, or a CHMSL of the vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least 1 million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or a 4G or 5G broadband cellular network) technology provides for communication between vehicles and/or infrastructure based on information provided by one or more vehicles and/or information provided by a remote server or the like. Such vehicle communication systems may utilize aspects of the systems described in U.S. Pat. Nos. 10,819,943; 9,555,736; 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

The system may utilize aspects of driver monitoring systems and/or head and face direction and position tracking systems and/or eye tracking systems and/or gesture recognition systems. Such head and face direction and/or position tracking systems and/or eye tracking systems and/or gesture recognition systems may utilize aspects of the systems described in U.S. Pat. Nos. 10,958,830; 10,065,574; 10,017,114; 9,405,120 and/or 7,914,187, and/or U.S. Publication Nos. US-2022-0377219; US-2022-0254132; US-2022-0242438; US-2022-0111857; US-2021-0323473; US-2021-0291739; US-2020-0202151; US-2020-0143560; US-2020-0320320; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or International Publication Nos. WO 2023/034956; WO 2022/241423 and/or WO 2022/187805, which are hereby incorporated herein by reference in their entireties.

Optionally, the driver monitoring system may be integrated with a camera monitoring system (CMS) of the vehicle. The integrated vehicle system incorporates multiple inputs, such as from the inward viewing or driver monitoring camera and from the forward or outward viewing camera, as well as from a rearward viewing camera and sideward viewing cameras of the CMS, to provide the driver with unique collision mitigation capabilities based on full vehicle environment and driver awareness state. The image processing and detections and determinations are performed locally within the interior rearview mirror assembly and/or the overhead console region, depending on available space and electrical connections for the particular vehicle application. The CMS cameras and system may utilize aspects of the systems described in U.S. Publication Nos. US-2021-0245662; US-2021-0162926; US-2021-0155167; US-2018-

0134217 and/or US-2014-0285666, and/or International Publication No. WO 2022/150826, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular driver monitoring system, the vehicular driver monitoring system comprising:
    a camera disposed at an interior cabin of a vehicle equipped with the vehicular driver monitoring system, the camera viewing at least a head region of a driver of the vehicle, wherein the camera is operable to capture image data;
    wherein the camera comprises a CMOS imaging array having at least one million photosensors arranged in rows and columns;
    an electronic control unit (ECU) comprising electronic circuitry and associated software;
    wherein the electronic circuitry of the ECU comprises an image processor for processing image data captured by the camera;
    wherein, based on processing at the ECU of the captured image data, the vehicular driver monitoring system determines an attentiveness level of the driver;
    wherein, responsive to determination that the attentiveness level of the driver is below a threshold level of attentiveness, the vehicular driver monitoring system alerts a person exterior the vehicle of the determined inattentive driver; and
    wherein the vehicular driver monitoring system alerts the person exterior the vehicle of the determined inattentive driver by illuminating an exterior light that is disposed at an exterior portion of the vehicle and that is viewable by the person exterior the vehicle.

2. The vehicular driver monitoring system of claim 1, wherein the person exterior the vehicle comprises a driver of another vehicle.

3. The vehicular driver monitoring system of claim 2, wherein the exterior light of the vehicle comprises a rear exterior light, and wherein the other vehicle comprises a trailing vehicle that is rearward of the vehicle.

4. The vehicular driver monitoring system of claim 3, wherein the rear exterior light comprises one selected from the group consisting of (i) a brake light of the vehicle, (ii) a turn indicator of the vehicle, and (iii) a CHMSL of the vehicle.

5. The vehicular driver monitoring system of claim 3, wherein the rear exterior light comprises a dedicated indicator light of the vehicle that is only illuminated to alert the driver of the other vehicle of the determined inattentive driver.

6. The vehicular driver monitoring system of claim 1, wherein the vehicular driver monitoring system wirelessly communicates an alert signal to another vehicle to alert the person exterior the vehicle of the determined inattentive driver.

7. The vehicular driver monitoring system of claim 1, wherein the vehicular driver monitoring system determines the attentiveness level of the driver based on determination that the driver has been performing behavior that is indicative of the driver being drowsy for longer than a threshold period of time.

8. The vehicular driver monitoring system of claim 1, wherein the vehicular driver monitoring system determines that the attentiveness level of the driver is below the threshold level of attentiveness based on determination that the driver has performed behavior indicative of an inattentive driver.

9. The vehicular driver monitoring system of claim 1, wherein, responsive to the vehicular driver monitoring system determining that the driver has performed behavior indicative of an inattentive driver, the vehicular driver monitoring system displays an alert to the driver.

10. The vehicular driver monitoring system of claim 9, wherein the vehicular driver monitoring system determines that the attentiveness level of the driver is below the threshold level of attentiveness based on determination that the alert has been displayed to the driver for longer than a threshold period of time.

11. The vehicular driver monitoring system of claim 9, wherein the vehicular driver monitoring system determines that the attentiveness level of the driver is below the threshold level of attentiveness based on determination that the driver has failed to provide a response to the alert.

12. The vehicular driver monitoring system of claim 1, wherein the vehicular driver monitoring system communicates a signal exterior the vehicle to alert the person exterior the vehicle of the determined inattentive driver.

13. The vehicular driver monitoring system of claim 1, wherein the camera is accommodated by a mirror head of a vehicular interior rearview mirror assembly, and wherein the mirror head is adjustably attached at a mounting structure that attaches the vehicular interior rearview mirror assembly at an interior portion of the interior cabin of the vehicle, and wherein the camera is movable together and in tandem with the mirror head when the mirror head is adjusted relative to the mounting structure when the driver of the vehicle sets a preferred rearward view provided by the vehicular interior rearview mirror assembly.

14. The vehicular driver monitoring system of claim 13, wherein the mirror head comprises a mirror reflective element, and wherein the camera is accommodated by the mirror head behind the mirror reflective element and views through the mirror reflective element.

15. A vehicular driver monitoring system, the vehicular driver monitoring system comprising:
    a camera disposed at an interior cabin of a vehicle equipped with the vehicular driver monitoring system, the camera viewing at least a head region of a driver of the vehicle, wherein the camera is operable to capture image data;
    wherein the camera comprises a CMOS imaging array having at least one million photosensors arranged in rows and columns;
    an electronic control unit (ECU) comprising electronic circuitry and associated software;
    wherein the electronic circuitry of the ECU comprises an image processor for processing image data captured by the camera;
    wherein, based on processing at the ECU of the captured image data, the vehicular driver monitoring system determines an attentiveness level of the driver;
    wherein, responsive to the vehicular driver monitoring system determining that the driver has performed behavior indicative of an inattentive driver, the vehicular driver monitoring system displays an alert to the driver;
    wherein, responsive to determination that the attentiveness level of the driver is below a threshold level of attentiveness, the vehicular driver monitoring system alerts a person exterior the vehicle of the determined inattentive driver;

wherein the vehicular driver monitoring system alerts the person exterior the vehicle of the determined inattentive driver by illuminating an exterior light that is disposed at an exterior portion of the vehicle and that is viewable by the person exterior the vehicle; and wherein the vehicular driver monitoring system wirelessly communicates an alert signal to another vehicle to alert the person exterior the vehicle of the determined inattentive driver.

16. The vehicular driver monitoring system of claim 15, wherein the person exterior the vehicle comprises a driver of another vehicle.

17. The vehicular driver monitoring system of claim 16, wherein the exterior light of the vehicle comprises a rear exterior light, and wherein the other vehicle comprises a trailing vehicle that is rearward of the vehicle.

18. The vehicular driver monitoring system of claim 15, wherein the vehicular driver monitoring system determines that the attentiveness level of the driver of the vehicle is below the threshold level of attentiveness based on determination that the alert has been displayed to the driver for longer than a threshold period of time.

19. The vehicular driver monitoring system of claim 15, wherein the vehicular driver monitoring system determines that the attentiveness level of the driver of the vehicle is below the threshold level of attentiveness based on determination that the driver of the vehicle has failed to provide a response to the alert.

20. The vehicular driver monitoring system of claim 15, wherein the camera is accommodated by a mirror head of a vehicular interior rearview mirror assembly, and wherein the mirror head is adjustably attached at a mounting structure that attaches the vehicular interior rearview mirror assembly at an interior portion of the interior cabin of the vehicle, and wherein the camera is movable together and in tandem with the mirror head when the mirror head is adjusted relative to the mounting structure when the driver of the vehicle sets a preferred rearward view provided by the vehicular interior rearview mirror assembly.

21. A vehicular driver monitoring system, the vehicular driver monitoring system comprising:

a camera disposed at an interior cabin of a vehicle equipped with the vehicular driver monitoring system, the camera viewing at least a head region of a driver of the vehicle, wherein the camera is operable to capture image data;

wherein the camera comprises a CMOS imaging array having at least one million photosensors arranged in rows and columns;

an electronic control unit (ECU) comprising electronic circuitry and associated software;

wherein the electronic circuitry of the ECU comprises an image processor for processing image data captured by the camera;

wherein the camera is accommodated by a mirror head of a vehicular interior rearview mirror assembly, and wherein the mirror head is adjustably attached at a mounting structure that attaches the vehicular interior rearview mirror assembly at an interior portion of the interior cabin of the vehicle, and wherein the camera is movable together and in tandem with the mirror head when the mirror head is adjusted relative to the mounting structure when the driver of the vehicle sets a preferred rearward view provided by the vehicular interior rearview mirror assembly;

wherein, based on processing at the ECU of the captured image data, the vehicular driver monitoring system determines an attentiveness level of the driver;

wherein the vehicular driver monitoring system determines the attentiveness level of the driver based on determination that the driver has been performing behavior that is indicative of the driver being drowsy for longer than a threshold period of time;

wherein, responsive to determination that the attentiveness level of the driver is below a threshold level of attentiveness, the vehicular driver monitoring system alerts a person exterior the vehicle of the determined inattentive driver; and wherein the vehicular driver monitoring system alerts the person exterior the vehicle of the determined inattentive driver by illuminating an exterior light that is disposed at an exterior portion of the vehicle and that is viewable by the person exterior the vehicle.

22. The vehicular driver monitoring system of claim 21, wherein the person exterior the vehicle comprises a driver of another vehicle.

23. The vehicular driver monitoring system of claim 22, wherein the exterior light of the vehicle comprises a rear exterior light, and wherein the other vehicle comprises a trailing vehicle that is rearward of the vehicle.

24. The vehicular driver monitoring system of claim 21, wherein the vehicular driver monitoring system wirelessly communicates an alert signal to another vehicle to alert the person exterior the vehicle of the determined inattentive driver.

25. The vehicular driver monitoring system of claim 21, wherein the mirror head comprises a mirror reflective element, and wherein the camera is accommodated by the mirror head behind the mirror reflective element and views through the mirror reflective element.

\* \* \* \* \*